United States Patent [19]
Agnoff

[11] Patent Number: 5,092,444
[45] Date of Patent: Mar. 3, 1992

[54] CONSTANT SPEED DECLINE BELT CONVEYOR

[75] Inventor: Charles Agnoff, Wilmington, N.C.

[73] Assignee: Interroll Holding AG, San Antonino, Switzerland

[21] Appl. No.: 636,778

[22] Filed: Jan. 2, 1991

[51] Int. Cl.⁵ .............................................. B65G 11/00
[52] U.S. Cl. .................................................... 193/2 D
[58] Field of Search ............................. 193/2 D, 35 A

[56] References Cited

U.S. PATENT DOCUMENTS

| 595,522 | 12/1897 | Chambers | 193/2 D |
| 988,822 | 4/1911 | Rossin | 193/2 D |
| 997,276 | 7/1911 | Curtis | 193/2 D |

*Primary Examiner*—Joseph E. Valenza
*Assistant Examiner*—Cheryl L. Gastineau
*Attorney, Agent, or Firm*—Collard, Roe & Galgano

[57] ABSTRACT

A longitudinally-extending constant speed decline belt conveyor for conveying a load along a downwardly sloped planar surface thereon. An endless traction belt rotatable about terminal rollers at the ends thereof, has an upper run extending in the longitudinal direction along the entire length of the conveyor. At least one of the terminal rollers of the endless traction belt is a speed control or braking roller for applying a braking force to the traction belt. The braking roller retards the rotation of the endless belt thereby retarding the movement of the load along the conveyor. A traction belt is utilized for braking so that the loads on the belt may have a uniform braking action applied thereto continuously as the loads move downwardly along the conveyor.

7 Claims, 1 Drawing Sheet

CONSTANT SPEED DECLINE BELT CONVEYOR

BACKGROUND OF THE INVENTION

1. Field of the Invention

This invention relates to a longitudinally extending constant speed decline belt conveyor which includes a retarding apparatus to prevent loads traversing the same from travelling over the conveyor belt too rapidly. More particularly, the invention relates to a braking system in which an endless traction belt is utilized to apply a braking force to the bottom surface of the load. The invention addresses the unique problem of belt conveyors which operate in a decline mode. In other words, the conveyor is one where the loading end of the conveyor is higher than the discharge end.

2. Description of the Prior Art

Prior art devices are of two types, powered belt conveyors and non-powered roller conveyors. As shown in FIG. 1, belt conveyors utilize a motor and gear train which act as braking devices to prevent the objects that are being conveyed downhill from increasing in speed and running away. The head pulley, which is located at the top of the conveyor, is connected to the motor by chains or belts and the motor provides retarding torque to assure that the conveyed materials move down hill at a consistent speed. Such arrangements are expensive, require external power, and their mounting requires additional space. Moreover, the complex set of parts to accomplish this requires frequent maintenance and repair.

In general, the non-powered, gravity fed roller conveyors utilize a special speed control roller inserted among the plurality of rollers on the conveyor. These speed control rollers produce a braking force and control the maximum rate of advance of the load being conveyed down the gravity roller conveyor. These speed control or retarding rollers often were liquid filled as shown in U.S. Pat. No. 2,618,370 to Orwin, U.S. Pat. No. 3,511,350 to Stein, U.S. Pat. No. 2,607,459 to Ludwig et al, and U.S. Pat. No. 3,399,752 to Orwin. Non-liquid filled braking devices such as that shown in U.S. Pat. No. 3,655,021 to Froio have also been utilized.

One of the difficulties encountered in utilizing any of these prior art braking devices is that a braking action is developed only when the bottom surface of a load engages the braking roller. When such a load bottom surface moves across a braking roller, a braking action is applied only for the time of engagement between the roller engagement support surface and the braking roller.

The net result of using such a system is that the speed of the load travelling over the gravity roller conveyor is not properly controlled after the load moves past the brake roller. This results in damage to the loads being transported or to the gravity roller conveyor itself. While it is possible to increase the number of braking rollers utilized in a given conveyor system, this solution has been found to be very costly and complex. An example of this is disclosed in Newman, U.S. Pat. No. 4,383,598, which involved many brake units. However, this patent requires mechanical or electronic sensors and electronic circuitry which activates pneumatic cylinders.

SUMMARY OF THE INVENTION

It is an object of the present invention to provide a braking system for a longitudinally-extending gravity roller conveyor for slowing the movement of a load travelling thereon.

It is a further object of the invention to provide a braking system for a longitudinally-extending gravity roller, conveyor which braking system can engage the bottom surface of the load traversing the gravity roller conveyor system continuously and which can control the rate of descent of a wide variety of load base configurations.

It is yet another object of the present invention to provide a braking system for a longitudinally-extending gravity roller conveyor which is low cost and simple in design.

Accordingly, these and other related objects are achieved by a longitudinally-extending gravity roller conveyor designed for conveying a load supported by a conveyor belt. A plurality of rollers attached to the conveyor define a planar support surface. An endless traction belt of predetermined width is provided and is rotatable about the rollers and two terminal rollers at the ends thereof. The traction belt has an upper run extending in the longitudinal direction for the entire length of the conveyor.

In order to apply the braking force, at least one of the terminal rollers of the endless traction belt is a nonpowered speed control or braking roller. The braking roller, preferably a centrifugal brake roller, may be designed so that the force produced thereby is in direct proportion to the speed of the load. Thus, as the load speed increases, the retarding force produced by the tracking roller and traction belt also increases. Such devices have been used before for directly braking individual packages but the concept of using such a device as part of a belt conveyor is unique.

These and other objects and advantages of the present invention will become apparent from the following detailed description of the accompanying drawing which discloses one embodiment of the invention. It is to be understood that the drawing is designed for the purposes of illustration only, and not as a definition of the invention.

BRIEF DESCRIPTION OF THE DRAWINGS

Further advantages and details can be gleaned from the drawing wherein similar reference numerals denote similar elements through the several views.

DESCRIPTION OF THE PREFERRED EMBODIMENTS

Figure 1:
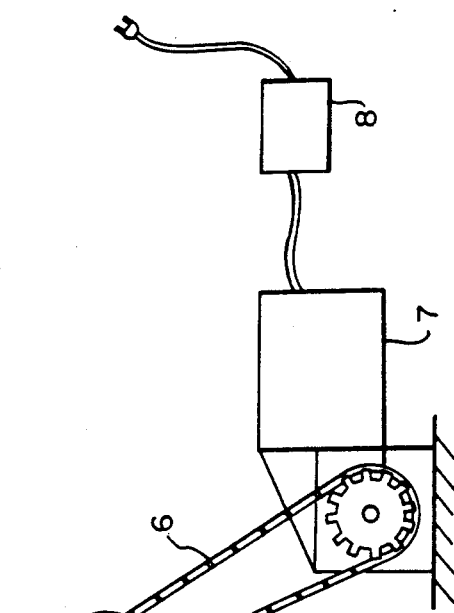
FIG. 1 is a schematically-illustrated side elevational view of the motorized gravity conveyor of the prior art.

Referring now to the drawings, and in particular to FIG. 1, there is shown a conventional constant speed decline belt conveyor generally denoted as 9, complete with drive pulley 1, idler pulley 2, and a plurality of rollers 3. An endless loop conveyor belt 4 is rotatable around rollers 3 and pulleys 1, 2. Conveyor belt 4 supports load 5 as it travels down the conveyor. Drive pulley 1 is connected by a chain 6 to motor 7 which, in turn, is connected to controller 8. In such an arrangement, motor 7 and chain 6 generally do not provide power. Rather they act as braking devices to prevent the objects that are being conveyed downhill from increasing in speed and running away. Drive pulley 1, chain 6, and motor 7 provide retarding torque to assure that the conveyed materials move downhill at a consistent speed. Such arrangements are expensive, require external power and their mounting requires additional space. Moreover, the complex set of parts to accomplish this requires frequent maintenance and repair.

Figure 2:
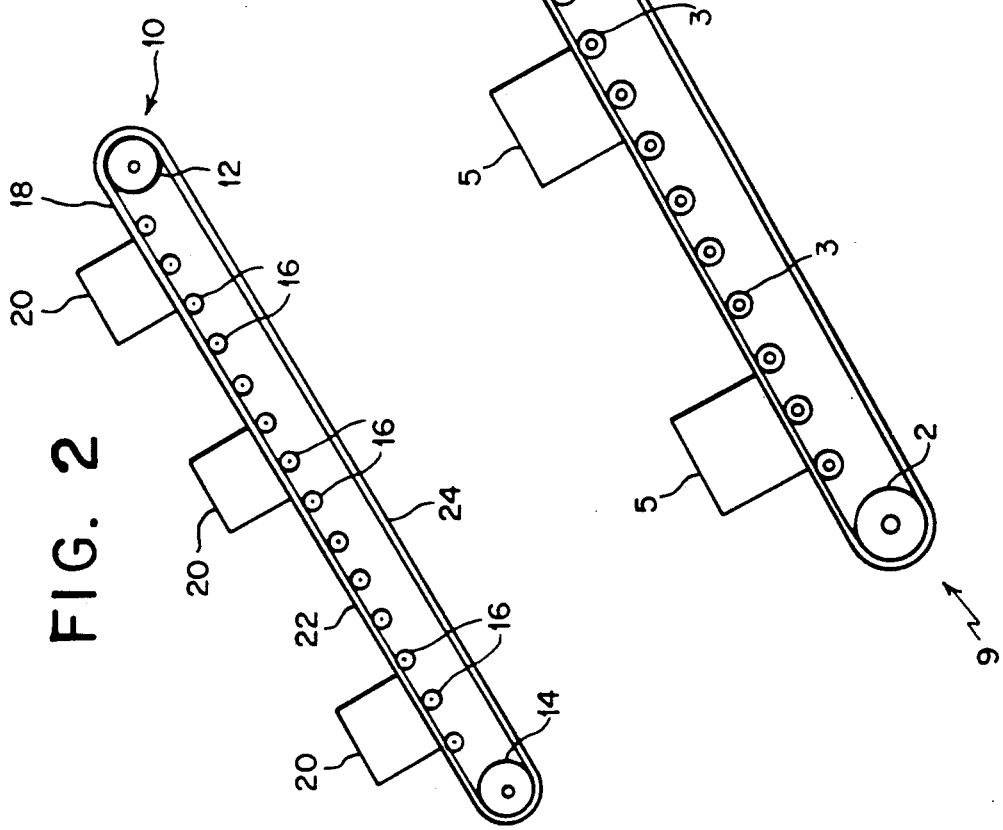
FIG. 2 is a schematically-illustrated side elevational view of the constant speed decline belt conveyor system embodying the present invention.

In FIG. 2, there is shown a constant speed decline belt conveyor system, according to the present invention, generally denoted as 10 which has terminal rollers or pulleys 12 and 14. In addition, free rotatable idler rollers 16 are placed between terminal rollers 12 and 14 which supports an endless loop conveyor belt 18 which carries a load 20. Head pulley 12 is located at the loading end of the conveyor belt which is elevated above the discharge end where terminal roller 14 is located. Head pulley 12 serves as a speed control or braking roller and is fitted internally with a conventional gear arrangement and centrifugal brake which responds to speed changes, i.e., greater braking force associated with higher speed. The speed reduction mechanism is of a type generally known and mentioned earlier. See, for example, U.S. Pat. No. 3,918,561 issued to Isacsson. The mechanism is capable of controlling the speed of all items on the conveyor regardless of their position along the conveyor or their base configurations.

If a conveyor is particularly long or will handle exceptionally heavy loads, terminal roller 14 can also be equipped with a speed reduction mechanism, preferably of a type fitted internally with a gear arrangement and centrifugal brake.

Accordingly, while only one embodiment of the present invention has been shown and described, it is obvious that many changes and modifications may be made thereunto, without departing from the spirit and scope of the invention.

What is claimed is:

1. A longitudinally-extending constant speed decline belt conveyor for conveying a load having a loading end and a discharge end, said loading end being at a greater height than said discharge end, comprising:
   a plurality of freely-rotatable rollers arranged in a spaced apart row supported on said conveyor, said rollers cooperatively defining a planar support surface;
   a terminal roller at each end of said conveyor, said terminal roller at said loading end being a centrifugal brake roller; and
   an endless traction belt rotatable about said terminal rollers, said endless traction belt having an upper run which extends the length of the planar surface and is supported by said rollers and supports said load as said load is conveyed along the support surface causing rotation of said rollers and said terminal rollers, said terminal speed control roller serving to exert a braking force on said endless traction belt thus controlling the speed of said load along the entire length of said planar surface and said conveyor.

2. The belt conveyor as set forth in claim 1, wherein said terminal roller at said discharge end of said conveyor is a speed control roller.

3. The belt conveyor as set forth in claim 2, wherein said speed control roller at said discharge end is a centrifugal brake roller.

4. The belt conveyor as set forth in claim 3, wherein said braking force produced by said brake rollers vary in direct proportion to the speed of the load along the planar support surface of the conveyor.

5. A longitudinally-extending constant speed decline belt conveyor for conveying a load having a loading end and a discharge end, said loading end being at a greater height than said discharge end, comprising:
   a plurality of freely-rotatable rollers arranged in a spaced-apart row supported on said conveyor, said rollers cooperatively defining a planar support surface;
   a terminal roller at each end of said conveyor, at least one of said terminal rollers being a non-powered speed control roller including internally situated braking means; and
   an endless traction belt rotatable about said terminal rollers, said endless traction belt having an upper run which extends the length of the planar surface and is supported by said rollers and supports said load as said load is conveyed along the support surface causing rotation of said rollers and said terminal rollers, said terminal speed control roller serving to exert a braking force on said endless traction belt, thus controlling the speed of said load along the entire length of said planar surface and said conveyor.

6. The belt conveyor as set forth in claim 5 wherein said non-powered speed control roller is a centrifugal brake rollers.

7. The belt conveyor as set forth in claim 6, wherein said braking force produced by said brake roller varies in direct proportion to the speed of the load along the planar support surface of the conveyor.

* * * * *